UNITED STATES PATENT OFFICE.

KARL KREKELER AND ADOLF ISRAEL, OF ELBERFELD, GERMANY, ASSIGNORS TO THE FARBENFABRIKEN OF ELBERFELD COMPANY, OF NEW YORK, N. Y.

BLACK TRISAZO DYE.

SPECIFICATION forming part of Letters Patent No. 602,856, dated April 26, 1898.

Application filed November 4, 1897. Serial No. 657,330. (Specimens.) Patented in Germany September 15, 1891, No. 65,262; in England December 28, 1891, No. 22,641; in France April 28, 1892, No. 221,233; in Italy June 30, 1892, XXVI, 32,191, and LXIII, 186, and in Austria-Hungary October 3, 1892, No. 1,242 and No. 16,870.

*To all whom it may concern:*

Be it known that we, KARL KREKELER and ADOLF ISRAEL, doctors of philosophy, subjects of the German Emperor, (assignors to the FARBENFABRIKEN OF ELBERFELD COMPANY, of New York,) residing at Elberfeld, Germany, have invented a certain new and useful Improvement in the Manufacture of Trisazo Dye, (for which the Farbenfabriken, vormals Fr. Bayer & Co., of Elberfeld, Germany, has already obtained Letters Patent in Germany, No. 65,262, dated September 15, 1891; in England, No. 22,641, dated December 28, 1891; in France, No. 221,233, dated April 28, 1892; in Austria-Hungary, No. 1,242 and No. 16,870, dated October 3, 1892, and in Italy, Reg. Gen., Vol. XXVI, No. 32,191, Reg. Att., Vol. LXIII, No. 186, dated June 30, 1892;) and we hereby declare the following to be a clear and exact description of our invention.

Our invention relates to the production of a new class of trisazo dyestuffs by first combining one molecule of a tetrazotized paradiamin—such as benzidin, tolidin, dianisidin, or the like—with one molecule of alpha-naphthylamin-beta-monosulfo-acid (1.6 or 1.7) or of salts thereof; secondly, diazotizing the resulting intermediate product, and, finally, coupling the tetrazo compound thus obtained with two molecules of 1.8 dioxynaphthalene, 4 monosulfo-acid, or of salts thereof. The dyestuffs thus obtained represent, when dry and pulverized, dark powders which dissolve in water with a blue color and yield on unmordanted cotton blue shades which when treated with solutions of chromium and copper salts change into black.

In carrying out our new process practically we can proceed as follows: 21.2 kilos, by weight, of tolidin are diazotized in the usual manner by means of sixty kilos, by weight, of a concentrated hydrochloric acid (containing thirty per cent. of HCl) and fourteen kilos, by weight, of sodium nitrite, keeping the temperature at zero. Into the resulting liquid a solution prepared by dissolving twenty-seven kilos, by weight, of the sodium salt of alpha-naphthylamin-beta-sulfo-acid (1.6 or 1.7) and twelve kilos, by weight, of sodium carbonate ($Na_2CO_3$) in three hundred liters of warm water, and subsequent cooling to zero by means of ice is added with stirring. If the formation of the intermediate product, which separates in the shape of a dark precipitate, is finished, the mixture is acidulated by means of fifty kilos, by weight, of a thirty-per-cent. hydrochloric acid, and a solution of 7.5 kilos, by weight, of sodium nitrite is added in order to diazotize the free amido group still contained in the intermediate product. After standing for several hours under continuous stirring the reaction mixture, which then will contain a tetrazo compound, is poured into a solution prepared by dissolving fifty-two kilos, by weight, of 1.8 dioxynaphthalene, 4 sulfonate of sodium and seventy kilos, by weight, of sodium acetate in fifteen hundred liters of water, which solution has been weakly acidulated by means of acetic acid. The resulting mixture is stirred for about twelve hours and subsequently rendered alkaline by adding forty-seven kilos, by weight, of sodium carbonate. Finally, the separated dyestuff is filtered, pressed, and dried.

It is the sodium salt of an acid having most probably the structural formula:

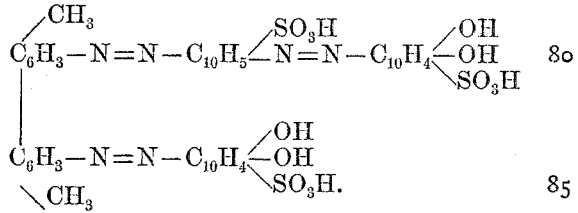

The same dyestuff is obtained if the intermediate product obtained from equimolecular proportions of tetrazo-ditolyl and alpha-naphthylamin-beta-sulfo-acid is first combined with one molecule of 1.8 dioxynaphthalene, 4 sulfonate of sodium, and the free amido group of the resulting tetrazo body is then diazotized, and the diazo compound thus obtained is finally combined with the second molecule of 1.8 dioxynaphthalene, 4 sulfonate of sodium.

The dyestuff prepared in one of the above-described manners represents, when dry and pulverized, a dark powder, dissolving in water with a blue color, a blue precipitate being obtained on the addition of acids to the watery solution.

By concentrated sulfuric acid the coloring-matter is dissolved, with a greenish-blue color. On adding ice to the sulfuric-acid solution a blue flaky precipitate is separated.

The new coloring-matter dyes unmordanted cotton blue shades. On treating the thus-dyed fibers with solutions of chromium and copper salts black shades of a great fastness against washing are produced.

Having now described our invention and in what manner the same is to be performed, what we claim as new, and desire to secure by Letters Patent, is—

1. The process for producing new trisazo dyestuffs by first combining one molecule of a tetrazotized paradiamin such as benzidin, tolidin, or dianisidin with one molecule of a beta-monosulfo-acid of alpha-naphthylamin such as 1.6 and 1.7, secondly diazotizing the resulting intermediate product and finally combining the tetrazo compound thus produced with two molecules of 1.8 dioxynaphthalene, 4 sulfo-acid, substantially as described.

2. The process for producing a new trisazo dyestuff by first combining equimolecular proportions of a tetrazo-ditolyl salt and a beta-monosulfo-acid of alpha-naphthylamin such as 1.6 and 1.7, secondly diazotizing the intermediate product thus obtained and finally coupling the resulting tetrazo compound with two molecules of 1.8 dioxynaphthalene, 4 monosulfo-acid, substantially as described.

3. As new articles of manufacture the trisazo dyestuffs derived from the diazotized intermediate product from one molecule of a tetrazotized paradiamin, such as benzidin, tolidin, dianisidin, with one molecule of a beta-monosulfo-acid of alpha-naphthylamin by combination with two molecules of 1.8 dioxynaphthalene, 4 sulfo-acid, representing dark powders soluble in water with blue color and yielding on unmordanted cotton blue shades which when treated with solutions of chromium and copper salts change into black, substantially as described.

4. As a new article of manufacture the specific dyestuff derived from the diazotized intermediate product from one molecule of tetrazo-ditolyl with one molecule of a beta-monosulfo-acid of alpha-naphthylamin by combination with two molecules of 1.8 dioxynaphthalene 4 monosulfo-acid, being an alkaline salt of an acid having most probably the structural formula:

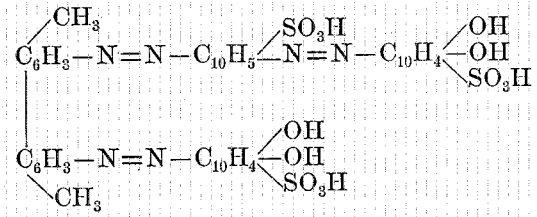

representing a dark powder dissolving in water yielding blue solutions, soluble in concentrated sulfuric acid with a blue color from which solution a blue flaky precipitate is separated on the addition of ice, dyeing unmordanted cotton blue shades which when treated with solutions of chromium and copper salts change into black fast to washing, substantially as described.

In testimony whereof we have signed our names in the presence of two subscribing witnesses.

KARL KREKELER.
ADOLF ISRAEL.

Witnesses:
R. E. JAHN,
OTTO KÖNIG.